United States Patent
Jang et al.

(10) Patent No.: US 8,055,316 B2
(45) Date of Patent: Nov. 8, 2011

(54) SLIDE MODULE AND MOBILE TERMINAL HAVING THE SAME

(75) Inventors: Chang-Yong Jang, Seoul (KR); Heui-Il Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 970 days.

(21) Appl. No.: 11/951,281

(22) Filed: Dec. 5, 2007

(65) Prior Publication Data

US 2008/0200222 A1      Aug. 21, 2008

(30) Foreign Application Priority Data

Dec. 5, 2006     (KR) .................. 10-2006-0122327

(51) Int. Cl.
*H04M 1/00*     (2006.01)
(52) U.S. Cl. .................. 455/575.4; 455/575.1
(58) Field of Classification Search ............... 455/575.4; D14/138 AD
See application file for complete search history.

(56) References Cited

U.S. PATENT DOCUMENTS

| | | | |
|---|---|---|---|
| 7,599,723 B2* | 10/2009 | Lee et al. | 455/575.4 |
| 7,697,280 B2* | 4/2010 | Wang | 361/679.55 |
| 2007/0155451 A1* | 7/2007 | Lee | 455/575.4 |
| 2008/0058039 A1* | 3/2008 | Lee et al. | 455/575.4 |

FOREIGN PATENT DOCUMENTS

KR    1020050102726    10/2005

* cited by examiner

*Primary Examiner* — Charles Appiah
*Assistant Examiner* — Stamford Hwang
(74) *Attorney, Agent, or Firm* — Lee, Hong, Degerman, Kang & Waimey

(57) ABSTRACT

A slide module includes a first slide member configured to slide upwardly and downwardly, a second slide member slidably mounted to the first slide member, an elastic force unit disposed between the first slide member and the second slide member, and having a plurality of elastic members mounted between a first rotation bar and a second rotation bar, wherein an elastic force is generated when the first rotation bar and the second rotation bar are rotated.

16 Claims, 4 Drawing Sheets

SLIDE MODULE AND MOBILE TERMINAL HAVING THE SAME

CROSS-REFERENCE TO RELATED APPLICATIONS

Pursuant to 35 U.S.C. §119(a), this non-provisional patent application claims the benefit of the earlier filing date and right of priority of Patent Application No. 10-2006-0122327 filed in Republic of Korea on Dec. 5, 2006, the entire contents of which are hereby incorporated by reference.

FIELD OF THE INVENTION

The present invention relates to a mobile terminal, and more particularly, to a slide module providing an elastic force when a first body is slid upwardly and downwardly relative to a second body.

DESCRIPTION OF RELATED ART

Generally, a slide module is mounted at a slide type mobile terminal to slidably support a first body and a second body attached to each other.

The slide module includes a first slide member fixed at a rear surface of the first body, a second slide member fixed at a front surface of the second body and slidably mounted on the first slide member, and an elastic force providing unit installed between the first slide member and the second slide member for providing an elastic force for the first slide member to be automatically slid when the first slide member is slid upwardly or downwardly relative to the second slide member.

The elastic force unit currently used has problems, such as slide module durability, preventing loosening as a result of longtime usage of the mobile terminal, reliability, and minimizing the size and thickness thereof as mobile terminals are gradually fabricated to be more compact.

SUMMARY OF THE INVENTION

In one general aspect of the present invention, a slide module includes a first slide member configured to slide upwardly and downwardly, a second slide member slidably mounted to the first slide member, an elastic force unit disposed between the first slide member and the second slide member, and having a plurality of elastic members mounted between a first rotation bar and a second rotation bar, wherein an elastic force is generated when the first rotation bar and the second rotation bar are rotated.

It is contemplated that the first rotation bar includes a first rod portion having a hinge hole configured to rotatably connect to the first slide member, a second rod portion extending from the first rod portion at a predetermined angle, and a third rod portion configured to extend from an end of the second rod portion at a predetermined angle to be parallel with the first rod portion.

It is further contemplated that the second rotation bar includes a first rod portion having a hinge hole configured to rotatably connect to the second slide member, a second rod portion extending from the first rod portion at a predetermined angle, and a third rod portion configured to extend from an end of the second rod portion at a predetermined angle to be parallel with the first rod portion.

It is contemplated that the elastic force unit further includes a hinge shaft configured to rotatably connect the first rotation bar and the second rotation bar at an overlapping portion of the first and second rotation bars. It is further contemplated that the elastic force unit further includes a plurality of elastic member mounting portions configured for mounting a first end of at least one of the plurality of elastic members to the second rod portion of the first rotation bar and a second end of the at least one of the plurality of elastic members to the third rod portion of the second rotation bar, and a first end of the at least one of the plurality of elastic members to the second rod portion of the second rotation bar and a second end of the plurality of elastic members to the third rod portion of the first rotation bar for generating the elastic force.

It is still further contemplated that each of the plurality of elastic members further includes a plurality of tension spring coils forming a spring connection ring at both the first and second ends of the elastic member for attaching to a connection pin formed on a lateral surface on the respective second rod portions and to a connection pin formed on a lateral surface on the respective third rod portions such that both the first and second ends of the elastic member are rotatably supported.

It is contemplated that each of the plurality of elastic members further includes a plurality of tension spring coils forming a diameter reduction portion at both first and second ends of the elastic member for attaching an insertion recess formed on a lateral surface on the respective second rod portions and formed on a lateral surface of the respective third rod portions, each insertion recess having a stopping portion protruding at a central portion of the insertion recess configured for stopping the spring coils.

In a second general aspect of the present invention, a mobile terminal includes a first body, a second body coupled with the first body, and a slide module disposed between the first body and the second body. The slide module includes a first slide member configured to rotatably connect to the first body, a second slide member slidably mounted to the first slide member and rotatably connected to the second body, and an elastic force unit disposed between the first slide member and the second slide member, and having a plurality of elastic members mounted between a first rotation bar and a second rotation bar, wherein an elastic force is generated when the first rotation bar and the second rotation bar are rotated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

Reference will now be made in detail to the preferred embodiments of the present invention, examples of which are illustrated in the accompanying drawings.

Figure 1:
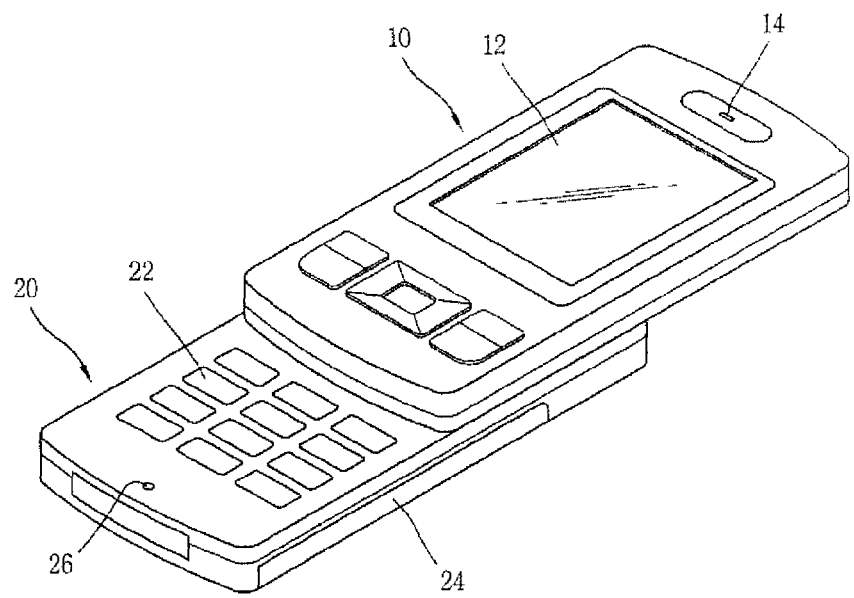
FIG. 1 is a perspective view of a mobile terminal in accordance with an embodiment of the present invention.
Figure 2:
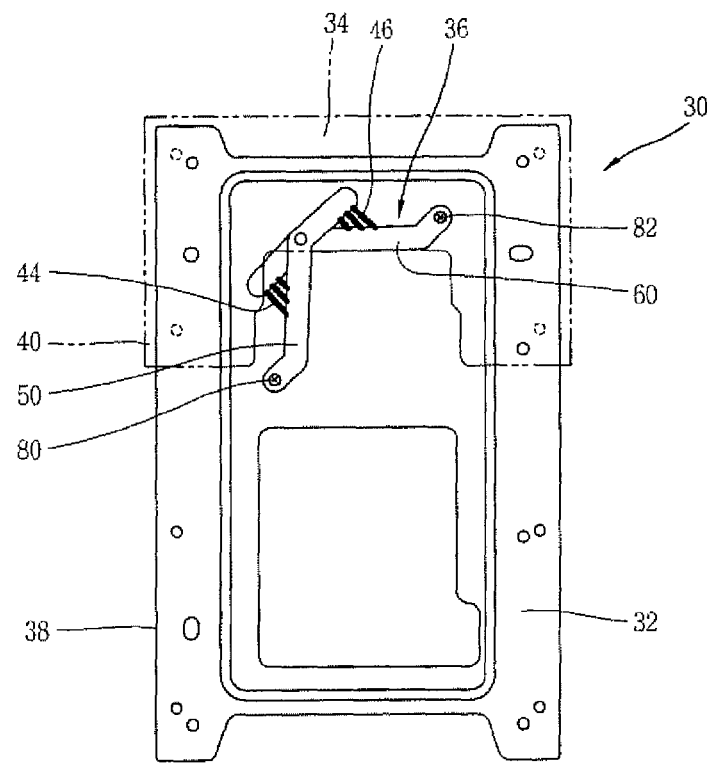
FIG. 2 is a plan view of a slide module in accordance with the embodiment of the present invention.
Figure 3:
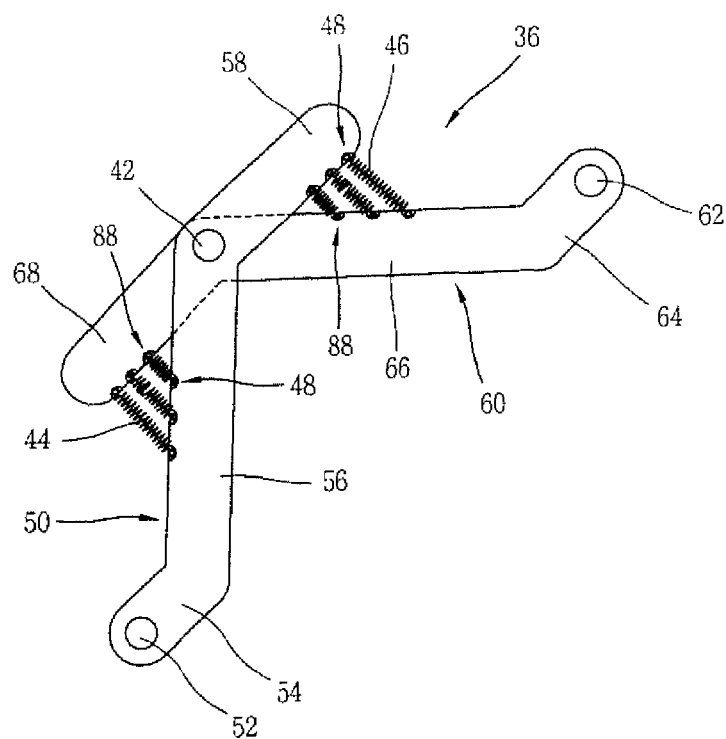
FIG. 3 is a perspective view of an elastic force unit in accordance with the embodiment of the present invention.

FIG. 1 is a perspective view of a portable terminal in accordance with one embodiment of the present invention, FIG. 2 is a plan view of a slide module in accordance with the embodiment of the present invention, and FIG. 3 is a plan view of an elastic force unit in accordance with the embodiment of the present invention.

The mobile terminal in accordance with the present invention may include a first body 10 provided with a display 12 for displaying information, a second body 20 slidably connected to the first body 10 and provided for mounting an input device 22 for inputting information and a battery 24 for supplying power, and a slide module 30 installed at the first body 10 and the second body 20 for guiding the first body 10 to slide relative to the second body 20.

A speaker 14 outputting sound may be installed at the first body 10, and a microphone 26 for inputting sound may be installed at the second body 20.

The slide module 30 may include a first slide member 32 fixed at a lower surface of the first body 10, a second slide member 34 slidably mounted to the first slide member 32 and fixed at an upper surface of the second body 20, and an elastic force unit 36 installed between the first slide member 32 and the second slide member 34. The elastic force unit 36 is configured to provide an elastic force movement when the first slide member 32 is slid upwardly or downwardly, allowing the first slide member 32 to be automatically moved.

The first slide member 32, formed in a plate shape, may be coupled to the lower surface of the first body 10 by a bolt and provided with a guide rail 38 at both edges. The second slide member 34, formed in the plate shape, may be coupled to the upper surface of the second body 20 by a bolt and provided with a guide groove 40 in which the guide rail 38 is inserted to be slid along the guide rail 38.

As illustrated in FIG. 3, the elastic force unit 36 may include a first rotation bar 50 having one end rotatably supported by the first slide member 32, a second rotation bar 60 having one end rotatably supported by the second slide member 34 and the other end rotatably connected to the first rotation bar 50 by a hinge shaft 42, and elastic members 44 and 46 connected between the first rotation bar 50 and the second rotation bar 60 for generating elastic force when the first rotation bar 50 and the second rotation bar 60 are centrally rotated around the hinge shaft 42.

The first rotation bar 50 includes a first rod portion 54 having a hinge hole 52 configured for mounting a hinge pin 80 rotatably connected to the first slide member 32, a second rod portion 56 curved from the first rod portion 54 by a predetermined angle, and a third rod portion 58 curved from an end of the second rod portion 56 at a predetermined angle to be parallel with the first rod portion 54. The third rod portion 58 also includes an elastic mounting portion 48 for mounting the elastic member 46.

The second rotation bar 60 may be disposed symmetrically with the first rotation bar 50 by a predetermined angle. The second rotation bar 60 includes a first rod portion 64 having a hinge hole 62 configured for mounting a hinge pin 82 rotatably connected to the second slide member 34, a second rod portion 66 curved from the first rod portion 64 and having a predetermined angle from the first rod portion 64, and a third rod portion 68 curved from an end of the second rod portion 66 at a predetermined angle to be parallel with the first rod portion 64. The third rod portion 68 also includes an elastic member mounting portion 88 for mounting the elastic member 44.

The second rod portion 56 of the first rotation bar 50 also includes an elastic member mounting portion 48 for mounting one end of the elastic member 44 on one lateral surface and second rod portion 66 of the second rotation bar 60 also includes an elastic member mounting portion 88 for mounting one end of the elastic member 44 on one lateral surface. The hinge shaft 42 connected to the second rotation bar 60 by the hinge via the elastic mounting portions 48 and 88.

The hinge shaft 42 may be rotatably mounted at an overlapping portion of the first rotation bar 50 and the second rotation bar 60 for rotatably connecting the first rotation bar 50 with the second rotation bar 60.

The hinge shaft 42 may be mounted at the second rod portions 56 and 66 of the first rotation bar 50 and the second rotation bar 60, respectively. The elastic force generated from the elastic members 44 and 46 is adjusted according to positions at which the hinge shaft 42 is rotated.

The elastic member 44 connects between the second rod portion 56 of the first rotation bar 50 and the third rod portion 68 of the second rotation bar 60. Similarly, elastic member 46 connects between the third rod portion 58 of the first rotation bar 50 and the second rod portion 66 of the second rotation bar 60.

The elastic members 44 and 46 may be formed with tension coil springs, and an elastic member mounting portions 48 and 88, respectively configured for attaching one end of the tension spring onto a lateral surface of each second rod portion 56 and 66.

Figure 4:
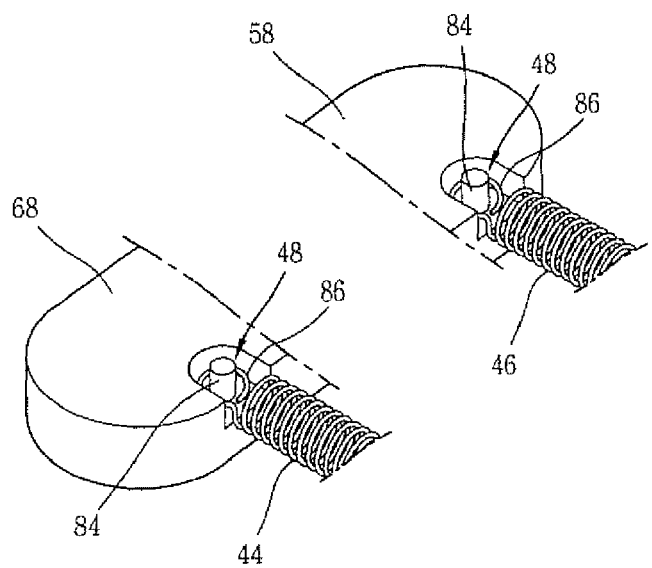
FIG. 4 is a partial perspective view illustrating an elastic mounting portion in accordance with one aspect of the present invention.

As illustrated in FIG. 4, one embodiment of the elastic member mounting portion 48 may include a cylindrical hinge pin 84 protruding from a lateral surface of each third rod portion 58 and 68, and having a thickness and direction for attaching to connection rings 86 formed at both ends of coil springs 44 and 46.

In the elastic member mounting portion 48 in accordance with the embodiment of the present invention, the connection ring 86 provided at the ends of the coil springs 44 and 46 may wind around the connection pin 84 formed at the lateral surface of the second rod portions 56 and 66. Accordingly, both ends of the coil springs 44 and 46 are rotatably supported, thereby preventing the first rotation bar 50 and the second rotation bar 60 from interfering with the spring when the first rotation bar 50 and the second rotation bar 60 are rotated.

Figure 5:
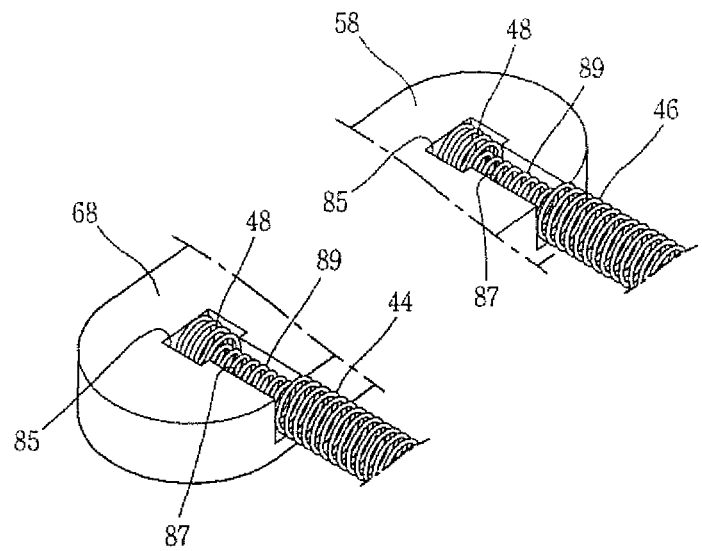
FIG. 5 is a partial perspective view illustrating another aspect of an elastic mounting portion in accordance with the present invention.

In another embodiment, as illustrated in FIG. 5, the elastic member mounting portion 148 may include an insertion recess 185 formed at the rod portions 56, 58, 66 and 68 configured for ends of the coil springs 44 and 46 to be inserted. A stopping portion 187 may be inwardly protruded from a central portion of the insertion recess 185 for receiving and stopping a diameter reduction portion 189 of the coil springs 44 and 46 which narrows at both ends.

As illustrated in FIG. 5, when both ends of the coil springs 44 and 46 are inserted into the insertion recess 185, respectively the ends of the springs 44 and 46 are stopped by the stopping portion 187, therefore both ends of the springs 44 and 46 are fixed at the rod portion.

Figure 6:
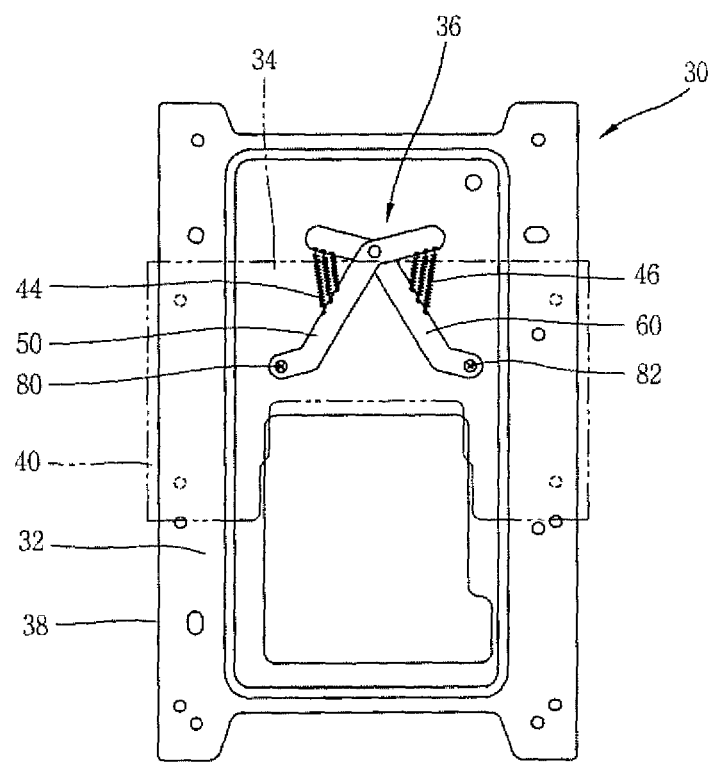
FIGS. 6 and 7 illustrate operation of the slide module in accordance with an embodiment of the present invention.
Figure 7:
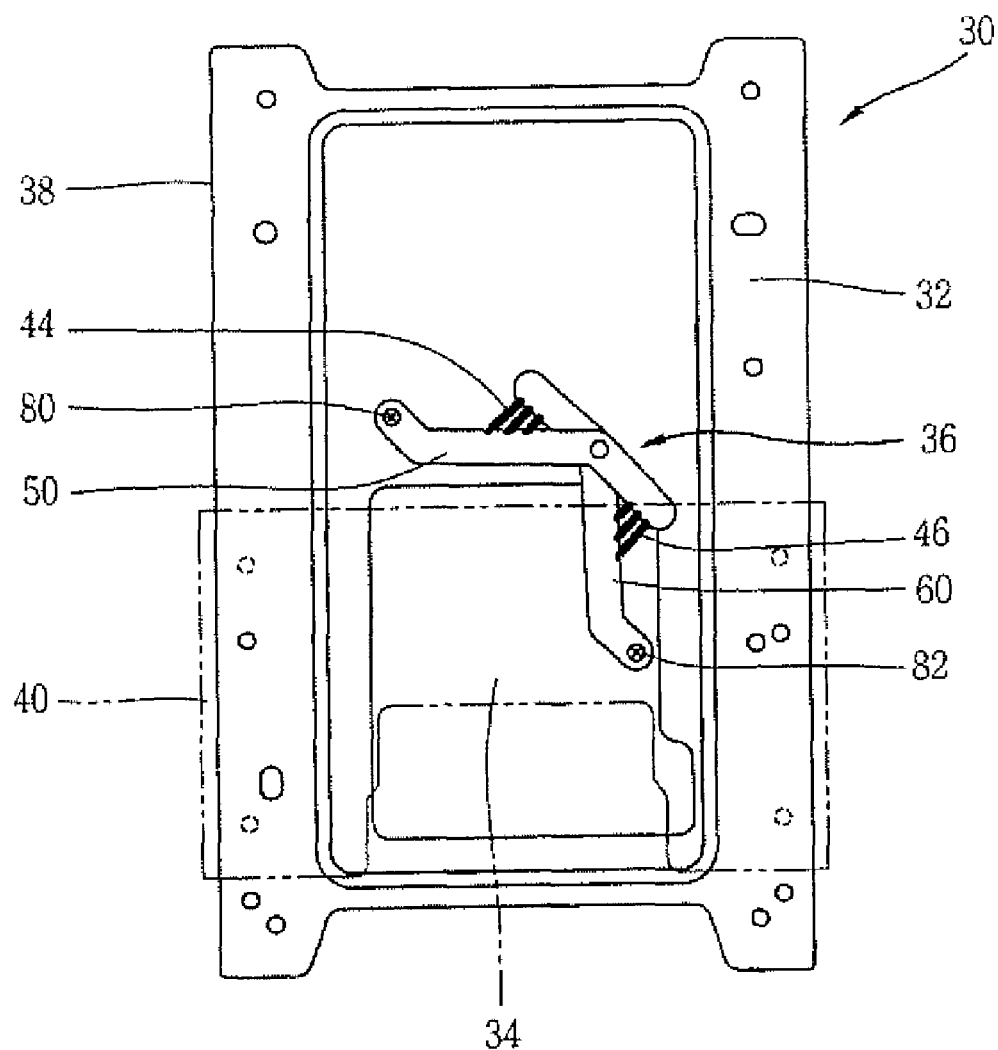

FIGS. 6 and 7 illustrate operation of the slide module 30 in accordance with an embodiment of the present invention.

As illustrated in FIG. 2, when the first slide member 32 is located at a lower side of the second slide member 34, the first body 10 may be closed with respect to the second body 20. At this time, the elastic force unit rotates to a maximum angle of separation between the first rotation bar 50 and the second rotation bar 60, wherein the elastic members 44 and 46 maintain a compressed state.

In this state, when the first body 10 is slid in an opened direction, the first slide member 32 is slid upwardly. Then, as illustrated in FIG. 6, the first rotation bar 50 and the second rotation bar 60 are independently rotated around the hinge shaft 42, thereby reducing the angle between the first rotation bar 50 and the second rotation bar 60. Accordingly, the elastic members 44 and 46 are stressed as the angle of separation is reduced.

As the first slide member 32 is further slid upwardly and passes a dead point, an elastic force generated by the elastic members 44 and 46 is exerted onto the first rotation bar 52 and the second rotation bar 54, thereby providing rotation in a widened angle of separation. Then, the first slide member 32 may be automatically slid in an opened direction by the elastic force generated from the elastic members 44 and 46.

Once the first slide member 32 is slid upwardly to a fully opened position, as illustrated in FIG. 7, the elastic force unit 36 may be positioned such that the first body 10 maintains the opened state by the elastic force from the elastic members 44 and 46.

In the mobile terminal having a slide module in accordance with the present invention and the configuration and operation as described above, the first rotation bar 50 is rotatably connected to the first slide member 32 by a hinge pin 80. The second rotation bar 60 is rotatably connected to the second slide member by the hinge pin 82 and rotatably connected with the first rotation bar 50. The elastic members 44 and 46 are connected to the first rotation bar 50 and the second rotation bar 60 for generating an elastic force. Accordingly, the slide module in accordance with the present invention is capable of simplifying and minimizing the structure, and enhancing durability and reliability of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics, it should also be understood that the above-described embodiments are not limited by the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A slide module, comprising:
   a first slide member;
   a second slide member slidably mounted to the first slide member; and
   an elastic force unit disposed between the first slide member and the second slide member, the elastic force unit having a plurality of elastic members mounted between a first rotation bar and a second rotation bar,
   wherein an elastic force is generated when the first rotation bar and the second rotation bar are rotated,
   wherein the first rotation bar comprises:
      a first rod portion rotatably connected to the first slide member;
      a second rod portion inclined at a predetermined angle and extending from the first rod portion; and
      a third rod portion inclined at a predetermined angle and configured to extend from an end of the second rod portion, and
   wherein the second rotation bar comprises:
      a first rod portion rotatably connected to the second slide member;
      a second rod portion inclined at a predetermined angle and extending from the first rod portion; and
      a third rod portion inclined at a predetermined angle and configured to extend from an end of the second rod portion.

2. The slide module of claim 1, wherein the third rod portion of the first rotation bar is configured to be parallel with the first rod portion of first rotation bar.

3. The slide module of claim 2, wherein the third rod portion of the second rotation bar is configured to be parallel with the first rod portion of the second rotation bar.

4. The slide module of claim 1, wherein the elastic force unit further comprises a hinge shaft configured to rotatably connect the first rotation bar and the second rotation bar at an overlapping portion of the first and second rotation bars.

5. The slide module of claim 4, wherein the elastic force unit further comprises:
   a plurality of elastic member mounting portions configured for mounting a first end of at least one of the plurality of elastic members to the second rod portion of the first rotation bar and a second end of the at least one of the plurality of elastic members to the third rod portion of the second rotation bar, and a first end of the at least one of the plurality of elastic members to the second rod portion of the second rotation bar and a second end of the plurality of elastic members to the third rod portion of the first rotation bar for generating the elastic force.

6. The slide module of claim 5, wherein each of the plurality of elastic members further comprises:
   a plurality of tension spring coils forming a spring connection ring at both the first and second ends of the elastic member for attaching to a connection pin formed on a lateral surface on the respective second rod portions and to a connection pin formed on a lateral surface on the respective third rod portions such that both the first and second ends of the elastic member are rotatably supported.

7. The slide module of claim 5, wherein each of the plurality of elastic members further comprises:
   a plurality of tension spring coils forming a diameter reduction portion at both first and second ends of the elastic member for attaching an insertion recess formed on a lateral surface on the respective second rod portions and formed on a lateral surface of the respective third rod portions, each insertion recess having a stopping portion protruding at a central portion of the insertion recess configured for stopping the spring coils.

8. A mobile terminal, comprising:
   a first body;
   a second body coupled with the first body; and
   a slide module disposed between the first body and the second body, wherein the slide module comprises a first slide member connected to the first body;

a second slide member slidably mounted to the first slide member and connected to the second body; and
an elastic force unit disposed between the first slide member and the second slide member, the elastic force unit having a plurality of elastic members mounted between a first rotation bar and a second rotation bar,
wherein an elastic force is generated when the first rotation bar and the second rotation bar are rotated,
wherein the first rotation bar comprises:
a first rod portion rotatably connected to the first slide member;
a second rod portion inclined at a predetermined angle and extending from the first rod portion; and
a third rod portion inclined at a predetermined angle and configured to extend from an end of the second rod portion, and wherein the second rotation bar comprises:
a first rod portion rotatably connected to the second slide member;
a second rod portion inclined at a predetermined angle and extending from the first rod portion; and
a third rod portion inclined at a predetermined angle and configured to extend from an end of the second rod portion.

9. The mobile terminal of claim 8, wherein the third rod portion of the first rotation bar is configured to be parallel with the first rod portion of the first rotation bar.

10. The mobile terminal of claim 9, wherein the third rod portion of the second rotation bar is configured to be parallel with the first rod portion of the second rotation bar.

11. The mobile terminal of claim 8, wherein the elastic force unit further comprises a hinge shaft configured to rotatably connect the first rotation bar and the second rotation bar at an overlapping portion of the first and second rotation bars.

12. The mobile terminal of claim 11, wherein the elastic force unit further comprises:
a plurality of elastic member mounting portions configured for mounting a first end of at least one of the plurality of elastic members to the second rod portion of the first rotation bar and a second end of the at least one of the plurality of elastic members to the third rod portion of the second rotation bar, and a first end of the at least one of the plurality of elastic members to the second rod portion of the second rotation bar and a second end of the plurality of elastic members to the third rod portion of the first rotation bar for generating the elastic force.

13. The mobile terminal of claim 12, wherein each of the plurality of elastic members further comprises:
a plurality of tension spring coils forming a spring connection ring at both the first and second ends of the elastic member for attaching to a connection pin formed on a lateral surface on the respective second rod portions and to a connection pin formed on a lateral surface on the respective third rod portions such that both the first and second ends of the elastic member are rotatably supported.

14. The mobile terminal of claim 12, wherein each of the plurality of elastic members further comprises:
a plurality of tension spring coils forming a diameter reduction portion at both first and second ends of the elastic member for attaching an insertion recess formed on a lateral surface on the respective second rod portions and formed on a lateral surface of the respective third rod portions, each insertion recess having a stopping portion protruding at a central portion of the insertion recess configured for stopping the spring coils.

15. The mobile terminal of claim 12, wherein the elastic force unit rotates to a maximum angle of separation between the first rotation bar and the second rotation bar, when the first body is in a closed state with respect to the second body, thereby compressing the elastic members whereby elastic force is not generated.

16. The mobile terminal of claim 12, wherein when the first body is in a closed state with respect to the second body and the first body is urged in an opened direction, the first slide member is slid upwardly to rotate the first rotation bar and the second rotation bar about a hinge shaft thereby reducing the angle of separation between the first and second rotation bars and stressing the elastic member and generating an elastic force to automatically open the first body.

* * * * *